Sept. 29, 1942.  F. WEGERDT  2,297,268
SHAPING MACHINE
Filed Aug. 19, 1937   15 Sheets-Sheet 2

Inventor:
Fritz Wegerdt
By Young Emery + Thompson
Attorneys

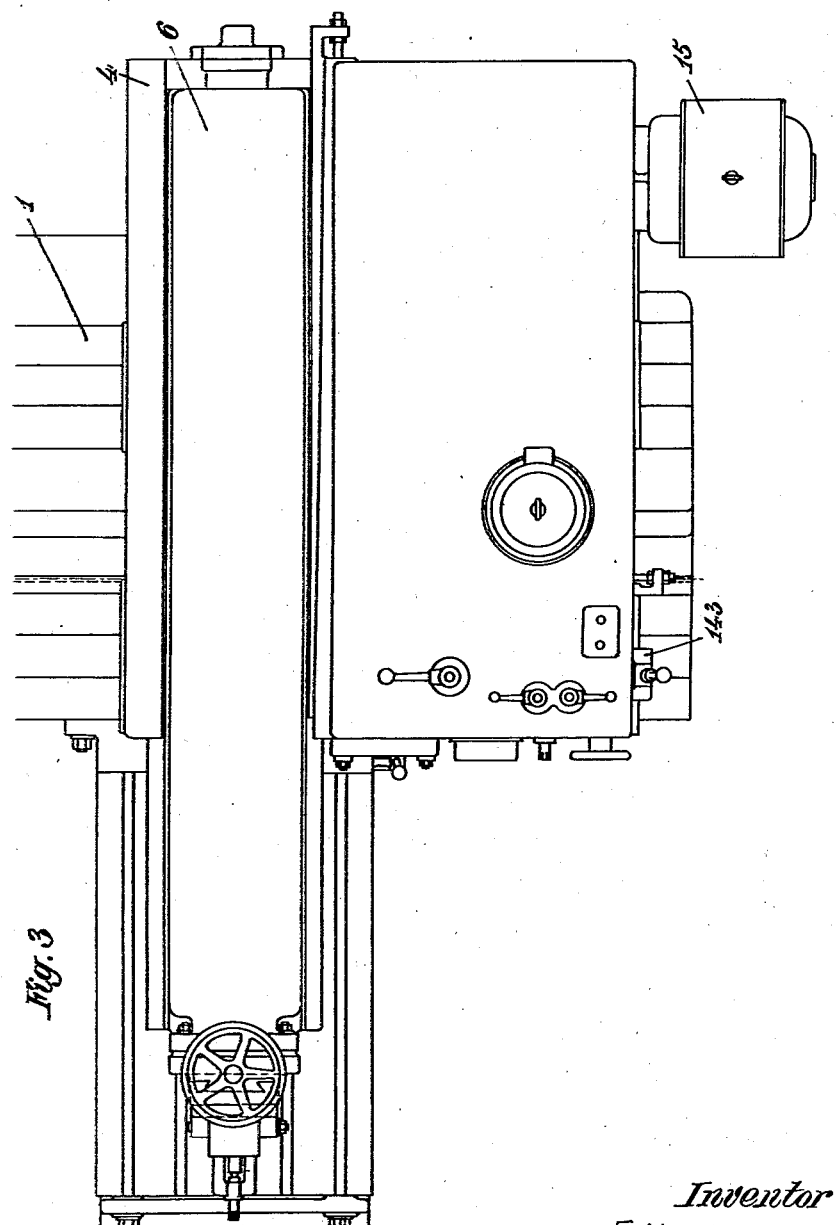

Sept. 29, 1942.    F. WEGERDT    2,297,268
SHAPING MACHINE
Filed Aug. 19, 1937    15 Sheets-Sheet 4
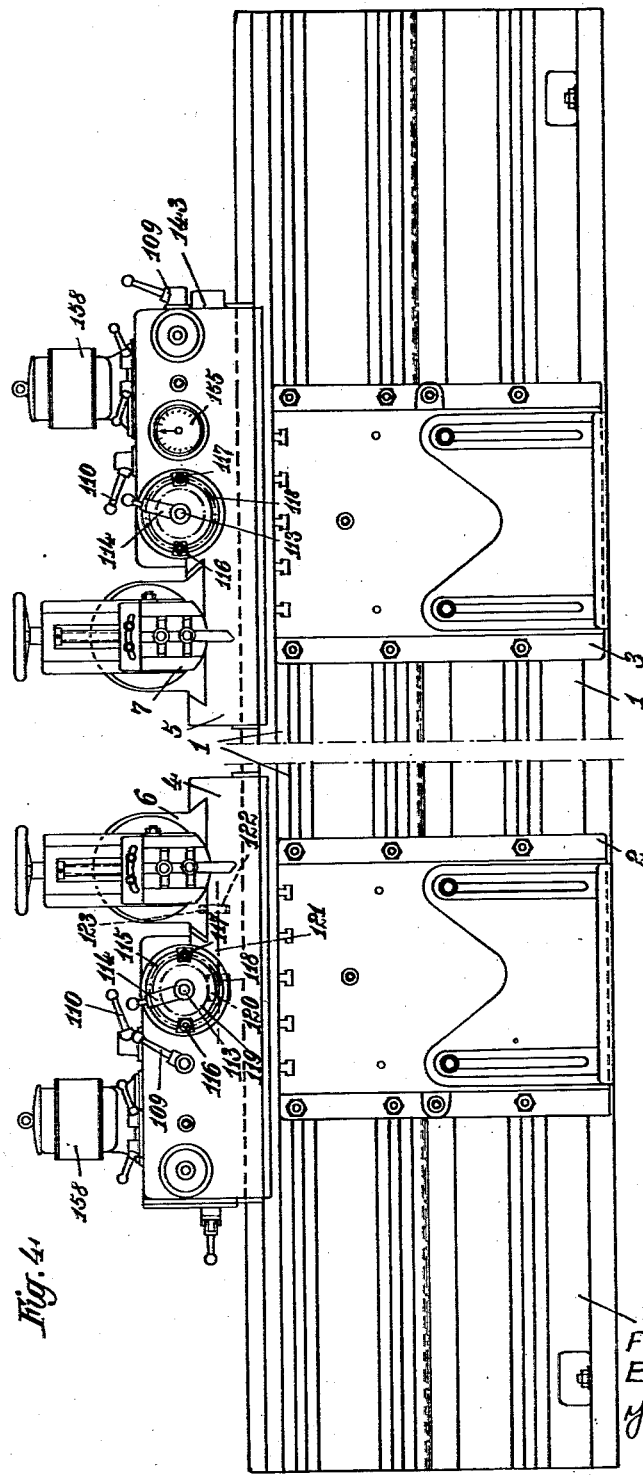
Inventor:
Fritz Wegerdt
By
Attorneys

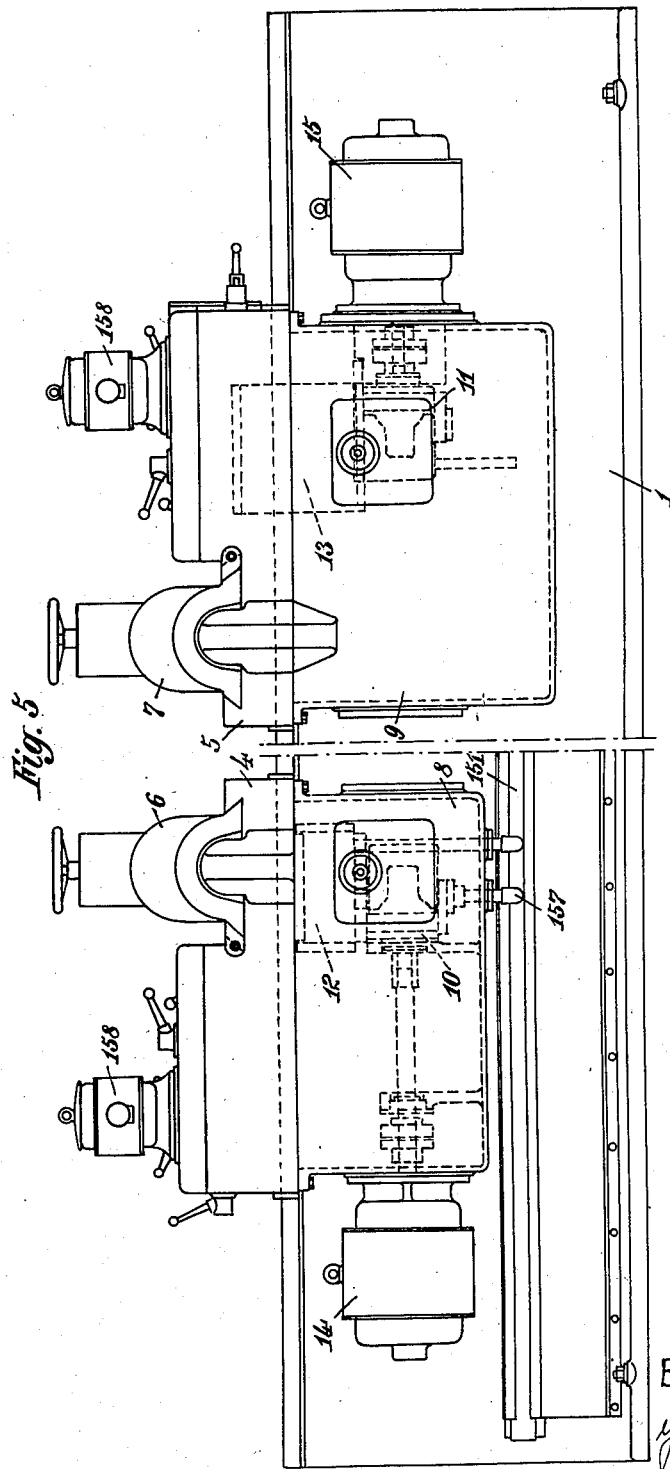

Sept. 29, 1942.          F. WEGERDT                    2,297,268
                       SHAPING MACHINE
                   Filed Aug. 19, 1937        15 Sheets—Sheet 6
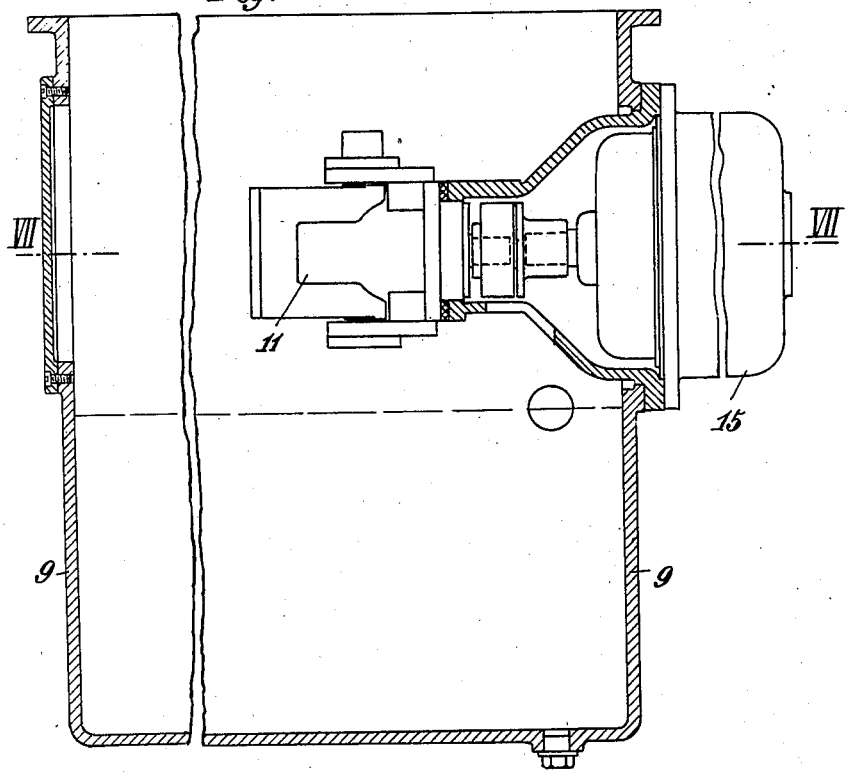
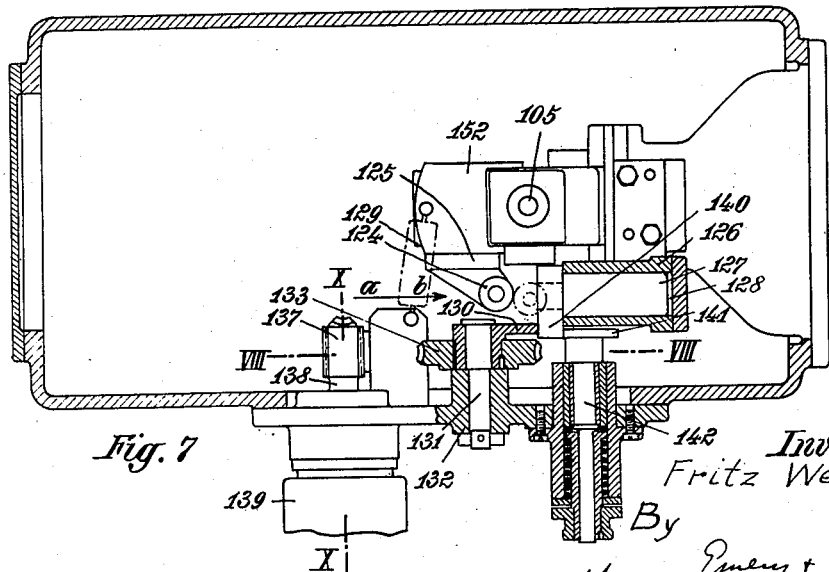
Inventor:
Fritz Wegerdt
By
Young, Emery & Thompson
Attorneys Sept. 29, 1942.  F. WEGERDT  2,297,268
SHAPING MACHINE
Filed Aug. 19, 1937  15 Sheets-Sheet 7
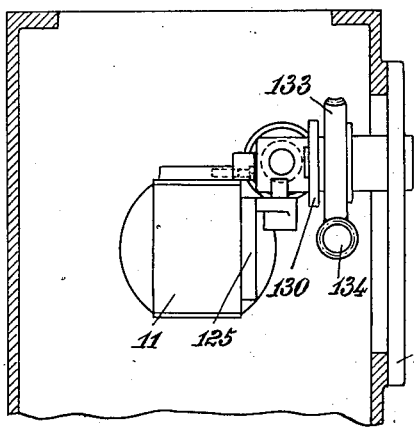
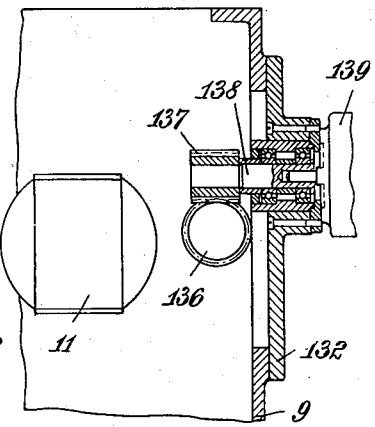
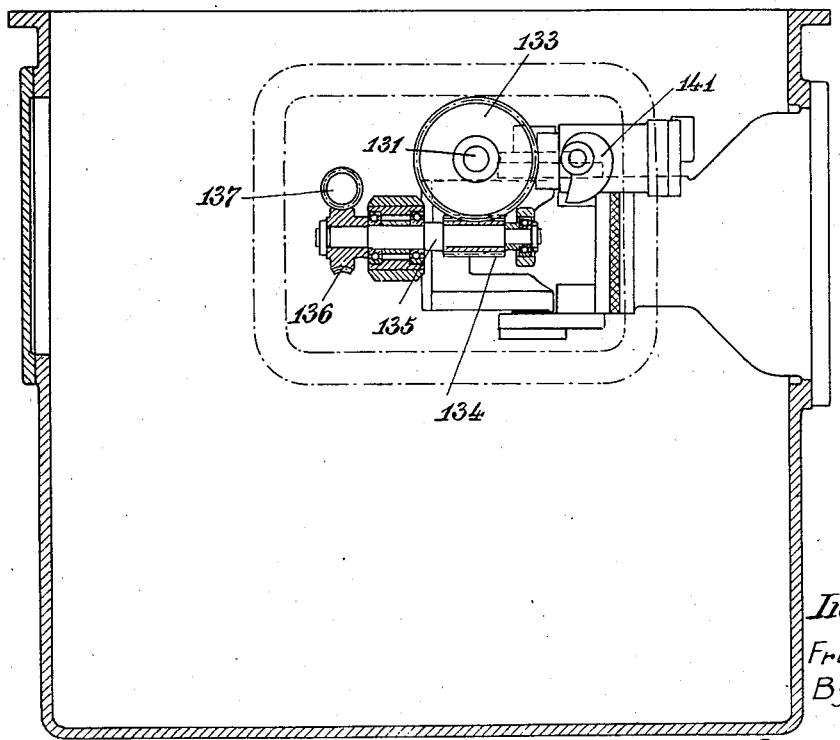
Inventor:
Fritz Wegerdt
By
Young Emery & Thompson
Attorneys

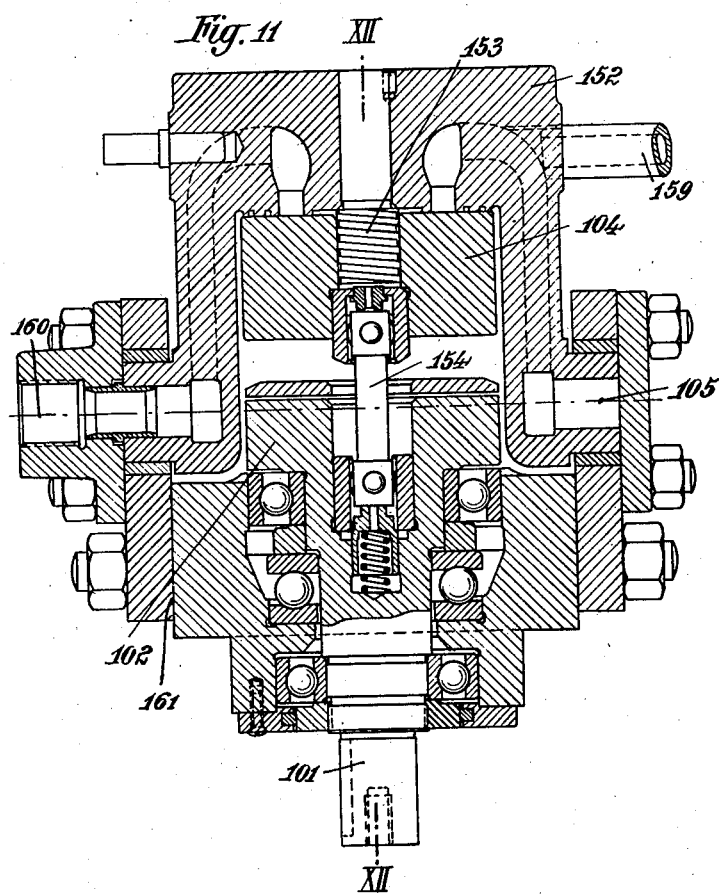

Sept. 29, 1942.  F. WEGERDT  2,297,268
SHAPING MACHINE
Filed Aug. 19, 1937  15 Sheets-Sheet 9
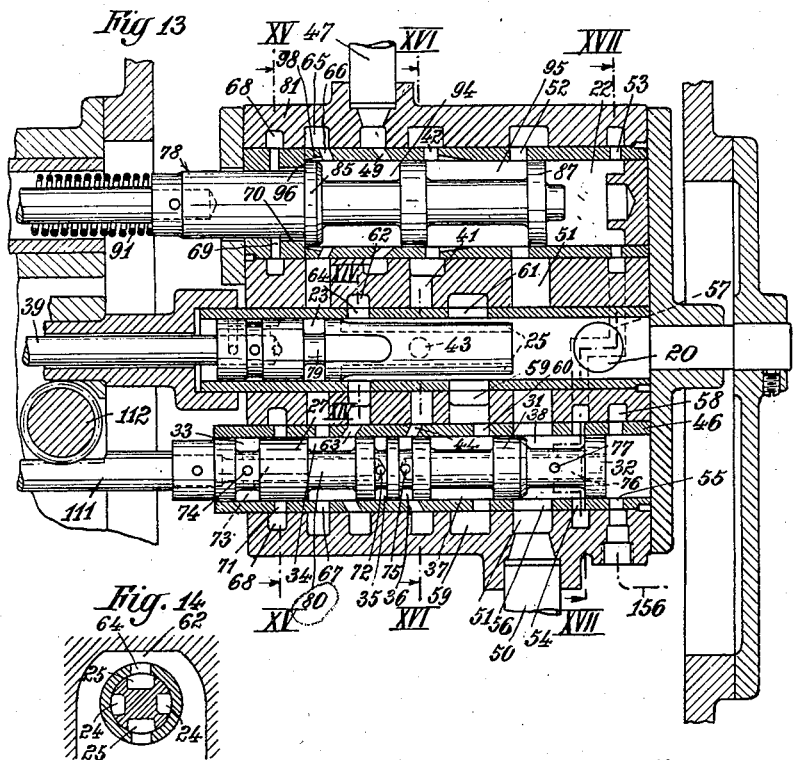
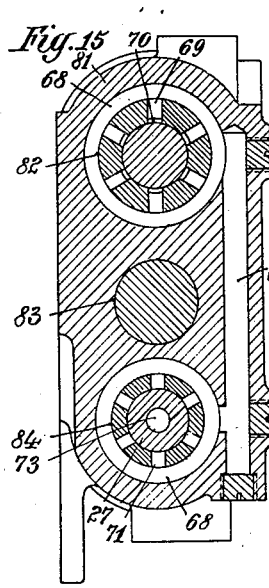 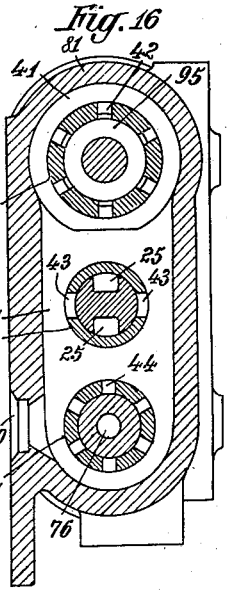 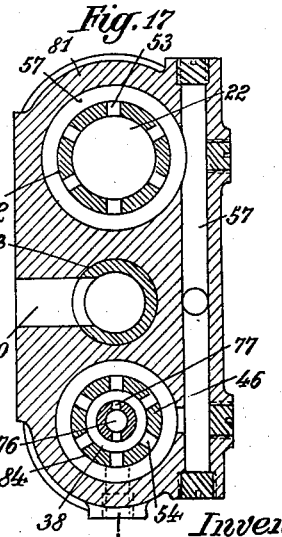
Inventor:
Fritz Wegerdt
By Young, Emery & Thompson
Attorneys

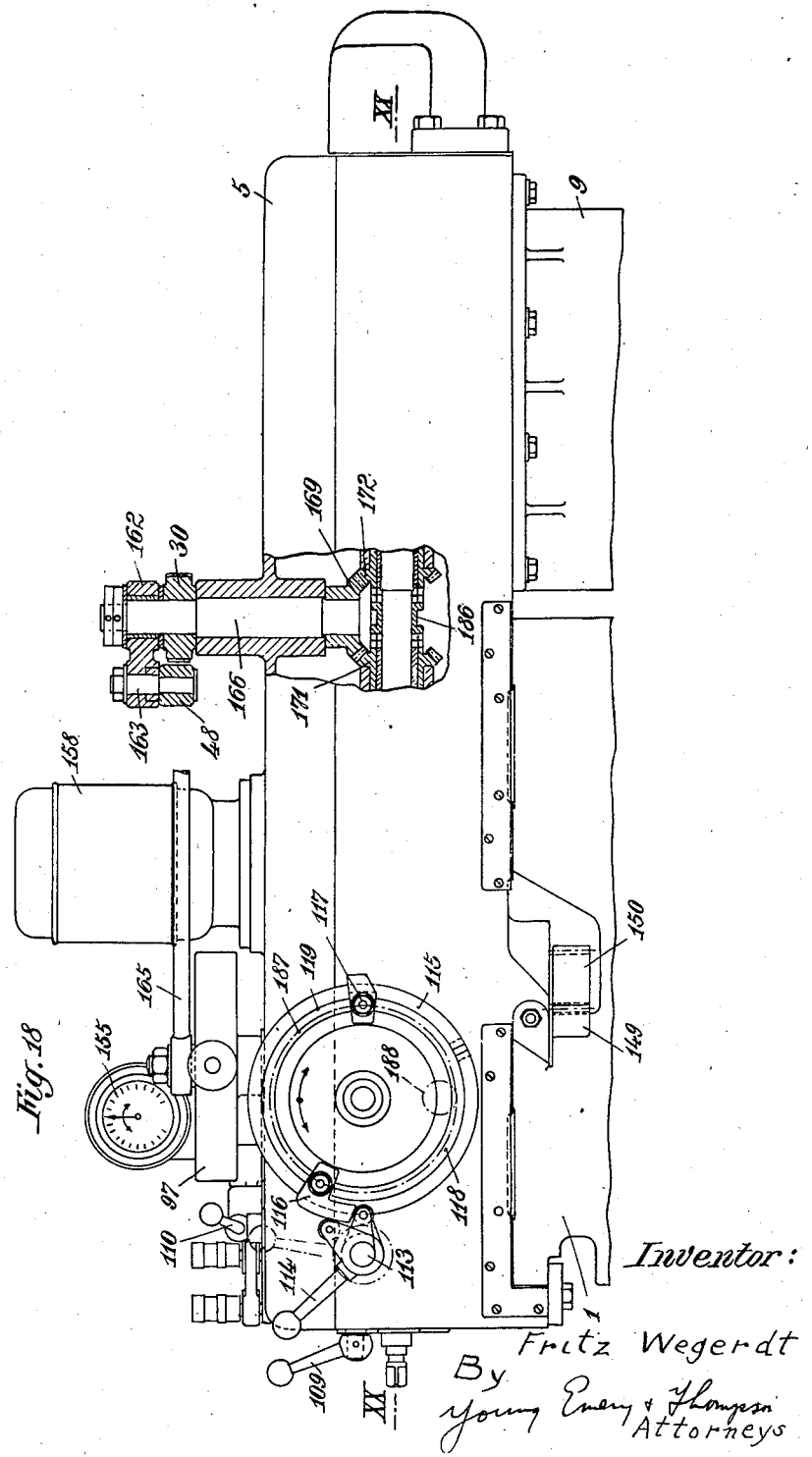

Sept. 29, 1942.　　　　F. WEGERDT　　　　2,297,268
SHAPING MACHINE
Filed Aug. 19, 1937　　　15 Sheets-Sheet 11
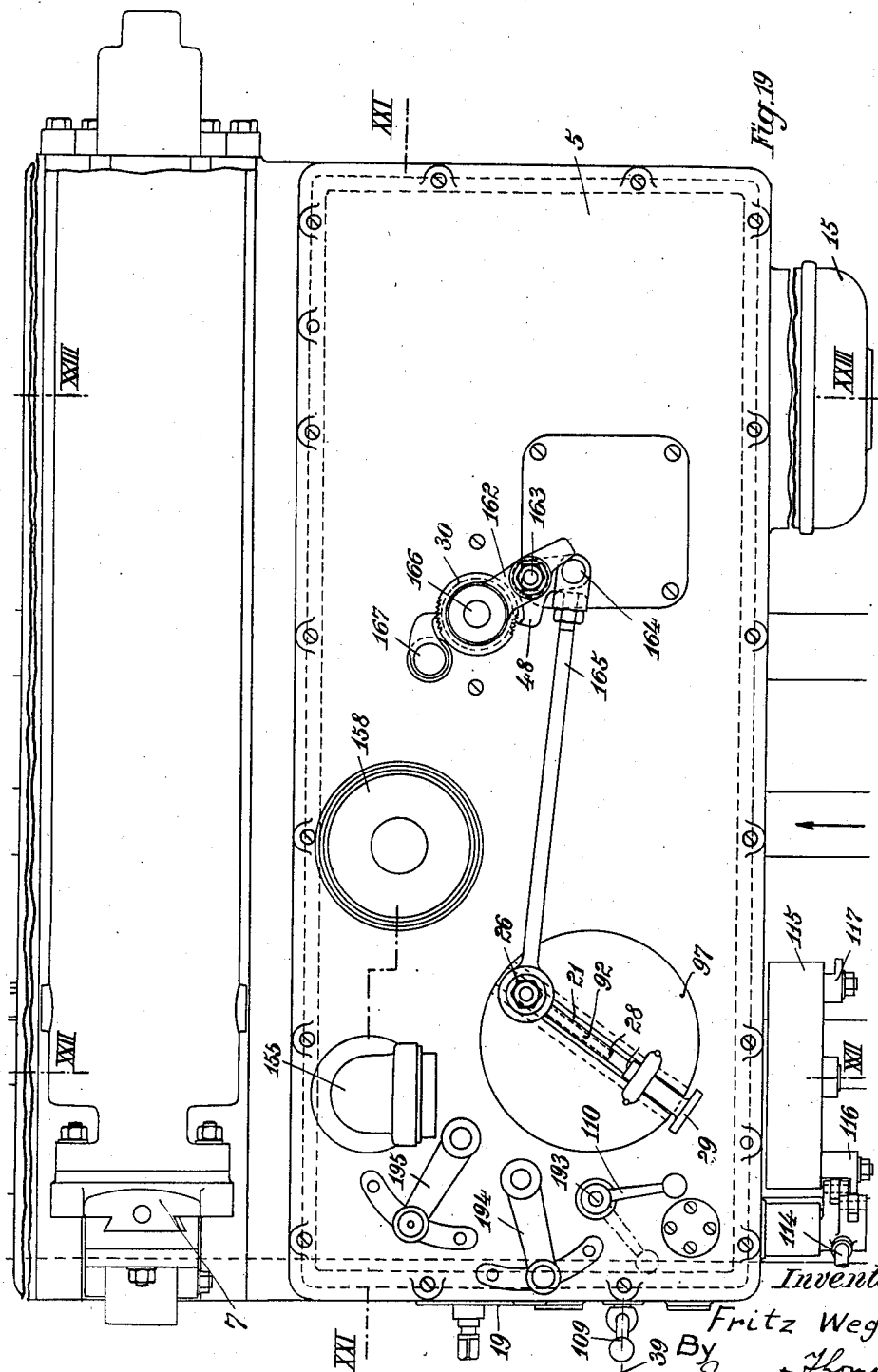

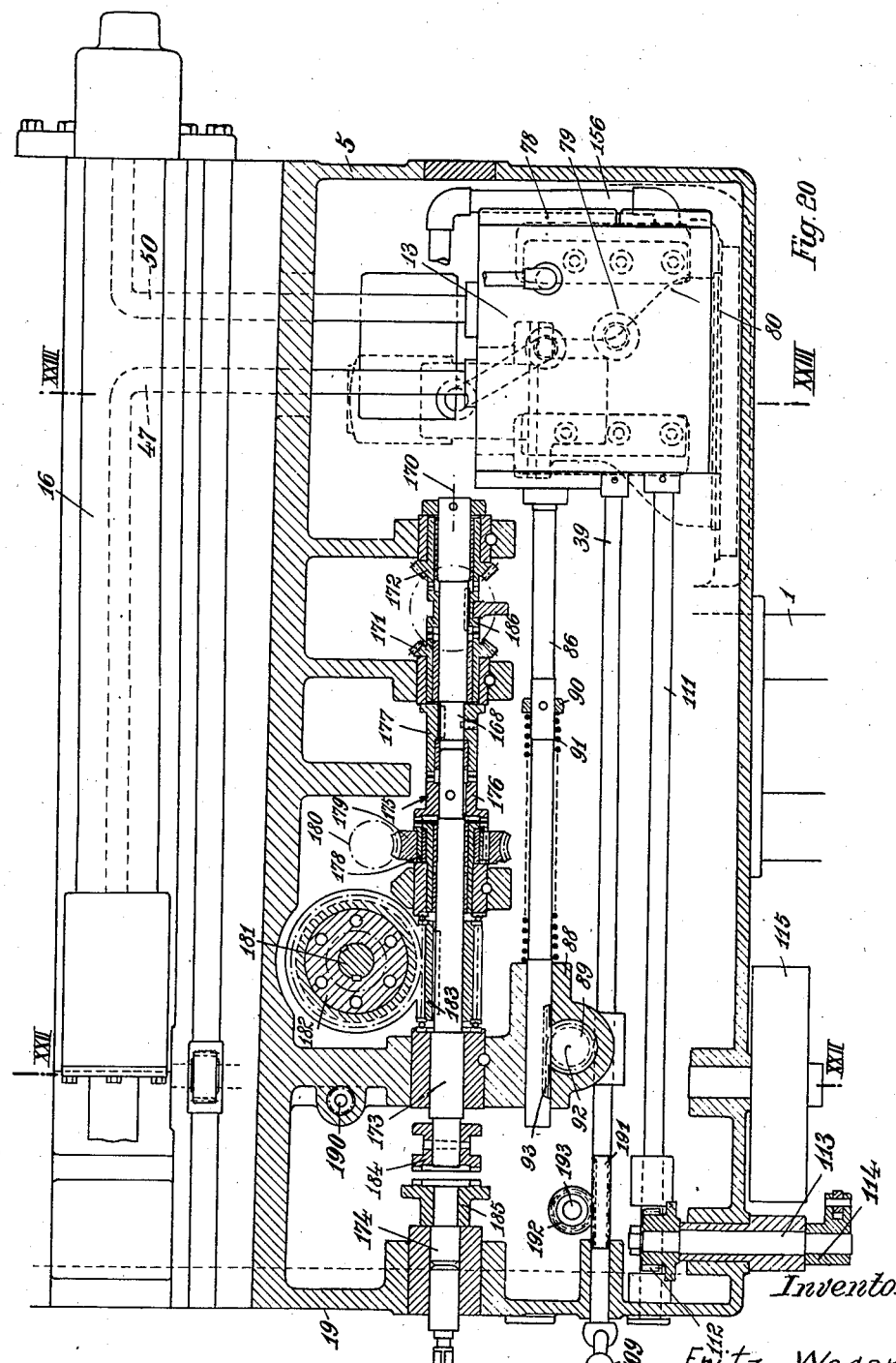

Sept. 29, 1942.　　F. WEGERDT　　2,297,268
SHAPING MACHINE
Filed Aug. 19, 1937　　15 Sheets-Sheet 13
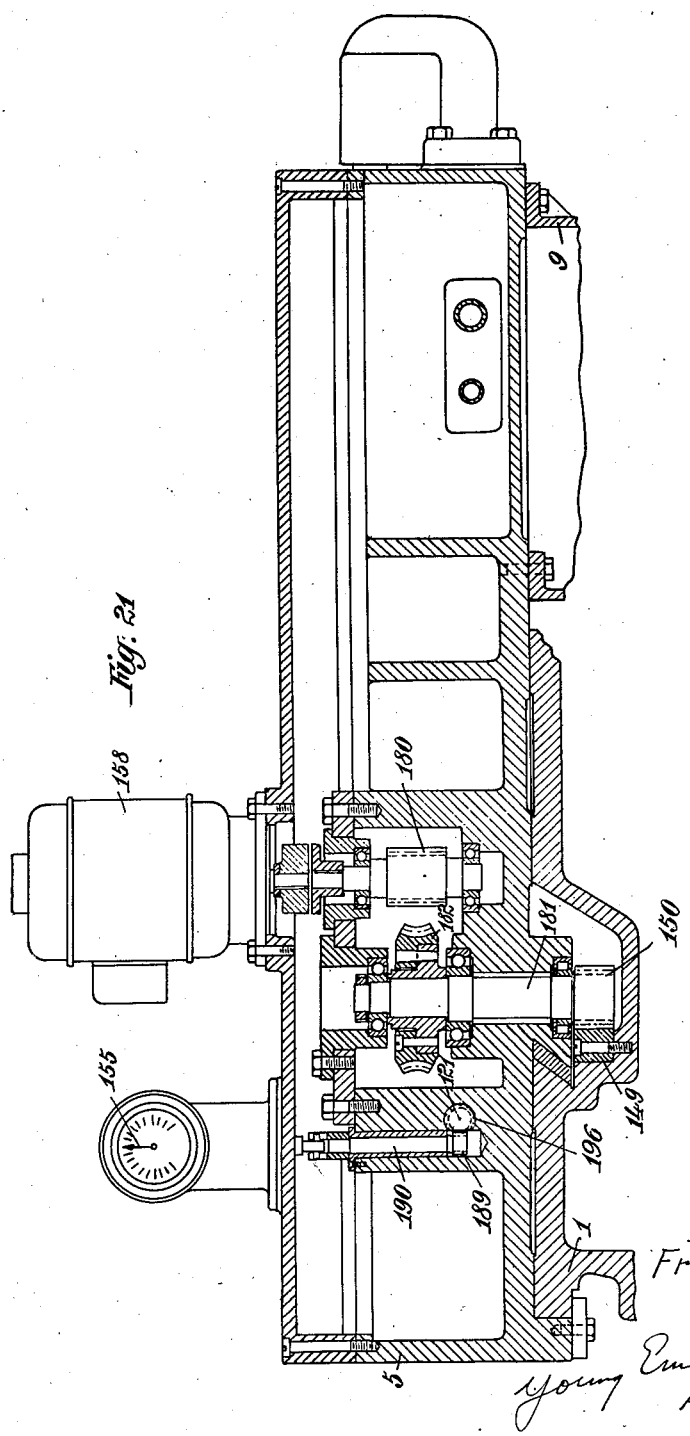
Inventor:
Fritz Wegerdt
Young, Emery & Thompson
Attorneys

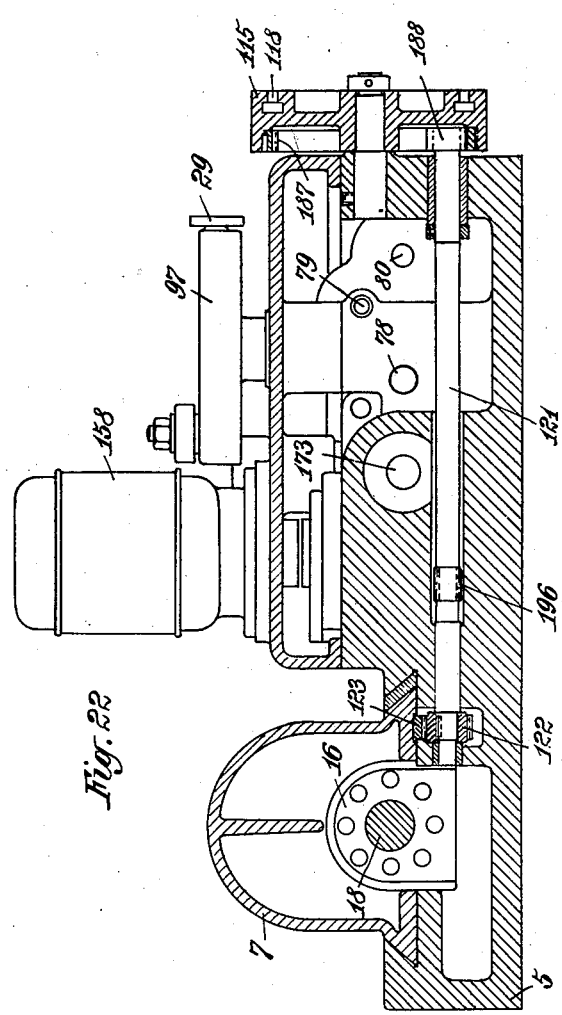

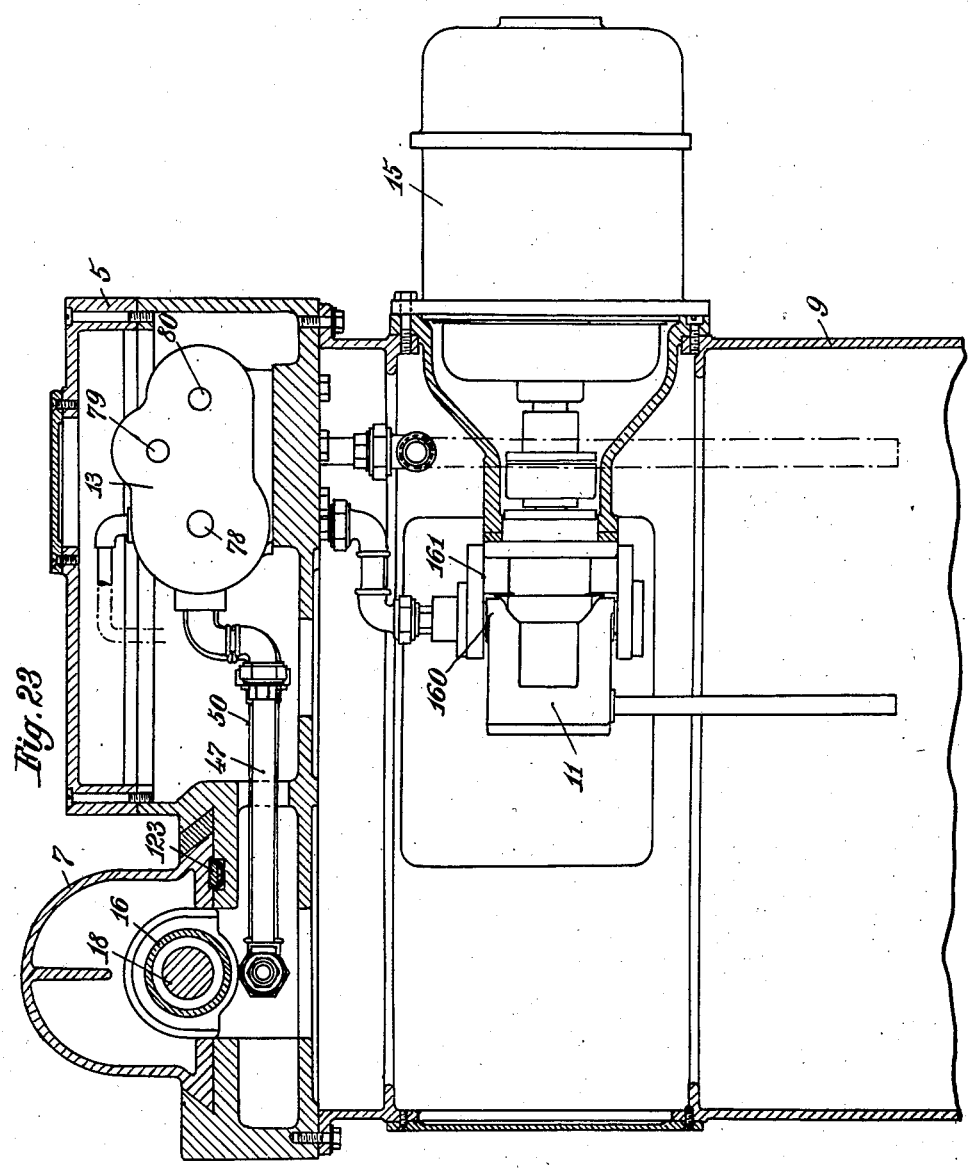

Patented Sept. 29, 1942

2,297,268

UNITED STATES PATENT OFFICE 2,297,268

SHAPING MACHINE

Fritz Wegerdt, Chemnitz, Germany; vested in the Alien Property Custodian

Application August 19, 1937, Serial No. 159,952
In Germany August 22, 1936

10 Claims. (Cl. 90—38)

The invention relates to a shaping machine, the tool holder slide of which is reciprocable transversely to the planing direction.

It is an object of the invention, in shaping machines the tool holder slide of which is reciprocable transversely to the planing direction, to drive the tool holder hydraulically and connect the pump and the control device of the hydraulic driving arrangement rigidly with the tool holder slide. It has been found that the pump and the control device, when suitably selected and arranged, may be rigidly connected to the tool holder slide without difficulty.

Further objects will be apparent from the following description and drawings.

Two embodiments of the invention are illustrated by way of examples in the accompanying drawings, in which:

Fig. 3 is a plan view of the tool holder with its slide.

Fig. 4 is a front view of the machine, showing the twin arrangement with two tool holder slides.

Fig. 5 is a rear view of the machine.

Fig. 6 is a longitudinal sectional view through the casing of Fig. 2.

Fig. 7 is a sectional view through the casing taken on line VII—VII of Fig. 6.

Fig. 8 is a sectional view taken on line VIII—VIII of Fig. 7.

Fig. 9 is a sectional view showing certain parts of Figs. 7 and 8 in side elevation as seen in the direction of the arrow a—b of Fig. 7.

Fig. 10 is a sectional view taken on the line X—X of Fig. 7.

Fig. 11 is a longitudinal section through the rotary piston pump of the hydraulic drive.

Fig. 13 is a longitudinal sectional view through a control device of the machine according to the invention.

Fig. 14 is a section taken on line XIV—XIV of Fig. 13.

Fig. 15 is a section taken on line XV—XV of Fig. 13.

Fig. 16 is a section taken on line XVI—XVI of Fig. 13.

Fig. 17 is a section taken on line XVII—XVII of Fig. 13.

Fig. 18 is a side view partly in section of the righthand slide (as seen from the work table) of the shaping machine as seen from the outside in the direction of the arrow of Fig. 19.

Fig. 19 is a plan view of the slide of Fig. 18.

Fig. 20 is a section taken on line XX—XX of Fig. 18.

Fig. 21 is a section taken on line XXI—XXI of Fig. 19.

Fig. 22 is a section taken on line XXII—XXII of Figs. 19 and 20.

Fig. 23 is a section taken on line XXIII—XXIII of Figs. 19 and 20.

Figure 1:
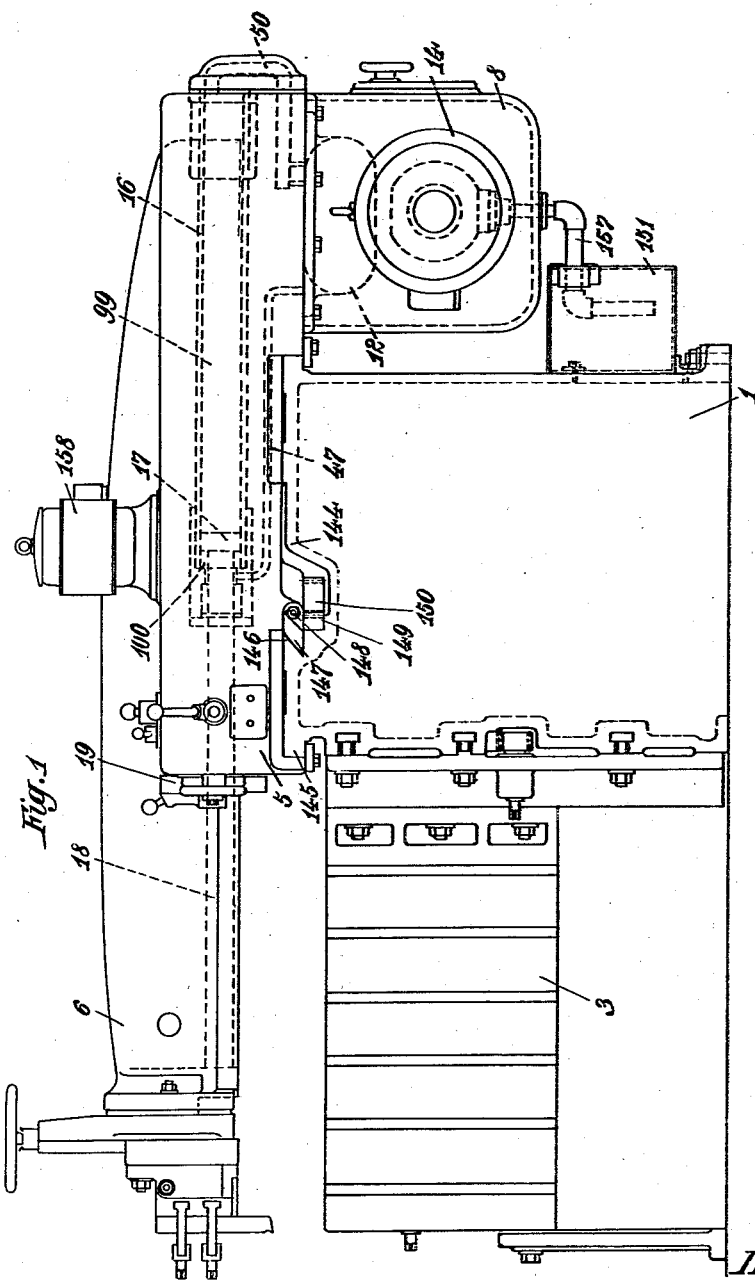
Fig. 1 is a side view of a shaping machine according to the invention.
Figure 2:
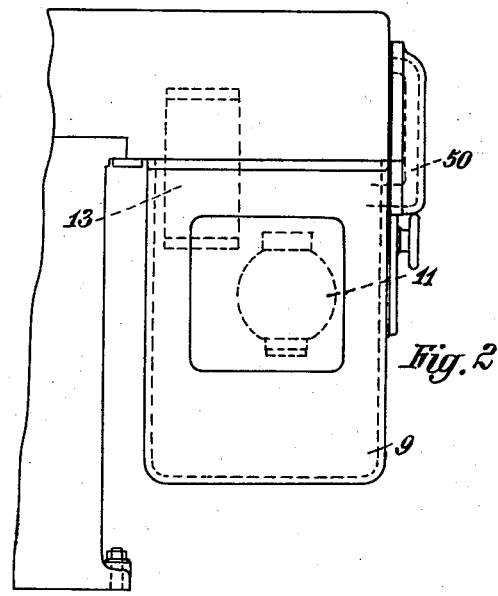
Fig. 2 is a side view showing the casing for the hydraulic driving aggregate.

In a shaping machine, i. e. a planing machine, the tool of which is located on a reciprocable holder, the advance movement transversely to the direction of movement of the tool holder is usually accomplished by the table on which the work piece is fixed. For numerous working operations it has however also been found advantageous to use a stationary table as work piece carrier, and to create the feed movement and the high-speed movement by moving the tool holder with the tool in a slide which is displaceable transversely to the direction of movement of the tool holder. Such shaping machines are frequently manufactured with twin tool holder slides, which are reciprocable transversely to the planing direction. In machines of this kind the slides of two tool holders are arranged in such a manner that they can be displaced along a common support, on which also the tables (there are usually two tables also) to which the work piece is clamped are fixed.

Such machines are particularly used for machining large and bulky pieces. Besides the usual requirement in machine tools of extremely exact and fine working, it is of very great importance that the machine may be utilised with high efficiency. The known shaping machines with tool holder slides which are reciprocable transversely to the planing direction fulfil these requirements only to an insufficient degree, so that it is necessary to make concessions as to efficiency of utilization in order to secure the required necessary exactness of working.

Although it has been known for a long time that shaping machines, in which the feed and the high-speed movements are caused by the table, can be driven hydraulically with great advantage, shaping machines the tool holder slides of which are moved transversely to the planing direction have hitherto exclusively been driven mechanically, for instance, by means of eccentrics or gear transmissions. This fact is the more remarkable since the hydraulic drive appears particularly well suited to satisfy all requirements to which such shaping machines with reciprocable slides are subjected. The cutting force acts in the direction of the resistance against cutting, so that a favorable efficiency with high yield is achieved. Also the adjustment is stepless, so that the cutting tool may be set very finely in accordance with the nature of the material, whereby the capacity of the machine can be fully utilised. Furthermore, when a hydraulic drive is used the speed of the return movement is kept constant so that the dead run times can be reduced to a minimum.

The reason why shaping machines with tool holder slides which are reciprocable transversely to the planing direction hitherto have without exception been operated mechanically, is that it is not possible in a reliable way to supply working fluid from a hydraulic stationary plant to the operating cylinder for the tool holder, which is movable in its slide lengthwise of the support. Elastic tubes have failed completely in shaping machines, because the frequent reversals of the slide movements involve a constant alternation between planing pressure and no load in the elastic tubes, so that a breathing is created in the tubes whereby they become unusable in a very short time.

The known hydraulic driving arrangements for shaping machines, consisting of pump, control devices and oil tank, are also so bulky that only a stationary mounting of same is possible. No attempts have been made to depart from this stationary arrangement and there has also not been any reason for doing so, since such an arrangement has not involved any special difficulties.

A particular deficiency of the mechanically driven shaping machine, the tool holder slide of which is reciprocated transversely to the planing direction, lies in the fact that the mechanical drive for the tool holder is arranged in the central part of and over the entire length of the support, so that the upper part of its top must be cut through entirely. This deficiency has only a limited effect in those shaping machines in which the feed and high speed movements of which are caused by the table, since the support naturally is short. In the case of shaping machines with tool holder slides reciprocable transversely to the planing direction, the support is so long that the stability of the entire machine is reduced by cutting through the tops of the support. This however impairs the precision of working of the machine and renders it impossible to load the same to give a high output.

The end of the tool holder slide opposite to that carrying the tool usually projects somewhat beyond the support in order that the tool holder is reliably guided. It is preferred to arrange the hydraulic drive on the lower side of this end of the slide. In this way the driving apparatus is arranged in a space, which in known machines is also present but is not utilised.

The members for the operation of the pump and the control device are suitably arranged on the end of the slide adjacent the tool. Compared with the known mechanically driven shaping machines, the tool holder slide of which is reciprocable transversely to the planing direction, the invention also possesses the advantage that a very simple connection may be used between these members and the pump and the control device. Therefore, in contrast to the known machines, no complicated intermediate parts, such as flexible shafts and the like are required, but only short and simple transmission elements, such as rigid shafts, gearings and levers.

The shifting of the auxiliary control valve, by means of which the slide is moved for reversing the tool holder movement, is suitably performed by means of a shaft, which is rotatably arranged in the slide and the end of which adjacent the attending face is connected with a lever which is movable between two stops adjustably fixed to a circular disc. This disc is in some way or another operatively connected to the reciprocating tool holder. The disc may for instance be equipped with a worm wheel, which is engaged by a worm shaft rotatably arranged in the tool holder slide and carries a gear, with which a rack meshes which is fixed to the tool holder in the direction of its movement. The gear ratio between the rack on the tool holder and the worm on the disc is so chosen that the longest stroke of the tool holder does not fully correspond with a revolution of the disc, since sufficient space must be provided for the stops.

The pump is preferably constructed as a rotary piston pump, the delivery of which is regulated by altering the stroke of the pump piston by deflecting the pump body. In the present invention it has been found particularly advantageous to effect the regulation of the pump by means of a small auxiliary electro-motor. It is also possible to transmit the movement for the deflection of the pump body mechanically to the attending face of the tool holder slide. However in view of the restricted space available it has been found advantageous to use electrical transmission.

In the following the invention will be particularly described with reference to the drawings.

Fixed on the support 1 are two tables 2 and 3, Fig. 4, to which the workpiece or pieces are clamped in any known manner. Arranged on the upper side of the support are two slides 4 and 5 which are displaceable in the longitudinal direction and serve as carriers for the tool holders 6 and 7. Both holders are arranged to reciprocate on the slides in such a manner, that their direction of movement is perpendicular to that of the slides. The slides 4 and 5 project somewhat beyond the support on the side of the support remote from the tables 2 and 3. On the lower side of these projecting ends of the tool holder slides are arranged casings 8, 9, Figs. 1 and 5, in each of which a pump 10, 11 and a control device 12, 13 respectively are located. The pumps are driven by electric motors 14, 15 respectively which by means of flanges are fixed to the corresponding casings 8 and 9.

The two slides 4 and 5 with their tool holders 6 and 7 may be arranged so that they present identical mirror images, that is with the tool holders practically adjacent to each other. In the arrangement of the parts care should be taken that the slides can move as close to each other as possible. As particularly shown in Fig. 5, some details of the slides 4 and 5 are of different form. The embodiment represented by the slide 5 is however preferred so that this slide will be described more fully in the following. Apart from the relations between the electromotor and the pump, the difference between the two embodiments resides particularly in the arrangement of the oil container. As shown in the right part of Fig. 5, and in Figs. 2 and 6 to 10, the casing 9 which accommodates the pump 11, the driving motor 15 and the control device, simultaneously serves as an oil collector vessel. The pump 11 draws in driving fluid from this vessel and the excess driving fluid flows back into the same. A special collector vessel 151, Figs. 1 and 5, which is fixed on the support 1 is provided for the drive of the tool holder 6, and into which a tube 157 projects, which during the advance of the slide 4 reciprocates in the vessel 151 and which is fixed to the container 8.

The tool holders 6, 7 are reciprocated by means of the fluid delivered from the pump. For this purpose a cylinder 16, Figs. 1 and 23, is fixed in each of the two slides 4, 5 and a piston 17 is arranged in this cylinder which is reciprocable in the direction of the stroke of the tool holder. The piston 17 is, in known manner, rigidly connected with the tool holder so that the exposed area of one side of the piston is larger than that of the other side. Both sides of the piston communicate through tubes 47 and 50 with the control device 12 or 13 and thus also with the pump 10 or 11. The control device 12, Fig. 1, is mounted horizontally on the pump 10, while the control device 13 is mounted vertically on the pump 11, Fig. 5.

The forward stroke of the tool holder is accomplished by supplying pressure fluid to the chamber 99, Fig. 1, of the cylinder facing the full cross-sectional area of the piston 17 and the other end of the cylinder is connected with the outlet vessel or the cylinder space 99. The return stroke of the piston, which, as is known, requires less force, is accomplished by charging the cylinder side 100, the effective piston surface of which is reduced by the area covered by the piston rod 18. The cylinder space 99 is connected with the outlet vessel in corresponding manner by means of the control device.

Provided in the control device 12 or 13 are three control slides, Figs. 13 to 17, namely the slide 78 by means of which the piston 17 of the working cylinder 16 is reversed, the slide 79 by means of which the working cylinder 16, 17 is placed into and out of action and the auxiliary slide 80 which controls the main slide 78 and which in a manner hereinafter described is operated by the reciprocating tool holder 6 or 7 by means of adjustable stops.

The casing 81, Figs. 13 to 17, for the control device has three parallel bores, which are lined with bushings 82, 83 and 84. The control slide 78 is longitudinally displaceable in the bore 82 and the control slides 79 and 80 are arranged in similar manner in the bores 83 and 84.

The control device shown in Figs. 13 to 17 operates in the following manner:

The return stroke side of the working cylinder 16 having the smaller piston surface communicates with the conduit 47, and the forward stroke side of the working cylinder 16 communicates with the conduit 50, Fig. 1. In Fig. 13 the central control slide 79 is shown in the position it assumes when the machine is operating. The pressure fluid from the pump enters the casing 81 of the control device through the opening 40, Fig. 16, and flows through the bores 43, the channel 41 and the slots 42 into the annular space 95 of the main control slide 78. The pressure fluid thereupon flows through the slots 52, the channel 51 and the conduit 50 into the righthand side of the cylinder.

From the channel 51 the pressure fluid also flows through the slots 56, Fig. 13, into the annular space 38 of the auxiliary control valve 80, and from there it flows into the space 22 of the main control valve 78 through the slots 54 and the channel 57. Thus, the valve 78 is securely held in its lefthand position against the action of the spring 91 by the pressure exerted by the pressure fluid on the right side of the piston 87.

From the left side of the cylinder, which in the described example corresponds with the return stroke of the machine, the pressure fluid flows through the conduit 47, Fig. 13, the channel 65 and the slots 67 to the annular space 34 of the auxiliary control valve 80. From the space 34 the pressure fluid flows through the slots 63, the channel 62 and the slots 64 and leaves the device through the longitudinal grooves 25 in the control slide 79.

The delivery side of the pressure fluid pump also communicates with the annular space 36, Fig. 13, of the preliminary control valve 80 through the channel 41 and the slots 44. The pressure fluid thereupon flows through the transverse bores 75 in the valve 80, the longitudinal bore 76 and the transverse bores 77 into the annular space 38. From this space 38 the pressure fluid flows through the slots 54 and the channel 57 into the space 22, in which it acts upon the piston 87 of the valve 78.

When the machine is to be reversed, the auxiliary control valve 80 is moved to the right, Fig. 13, in any known manner. At the same time that the piston 27 closes the slots 67 in the bushing 46, the piston 31 will cover the slots 56, whereby the channel 51 is brought into communication with the longitudinal slots 25 in the piston valve 79 and with the outlet container through the annular space 37, the slots 60, the channel 59 and the slots 61. The piston 32 of the preliminary control valve 80 also uncovers the slots 55 and the channel 58, whereby communication is established between the space 22 and the outlet container through the slots 53, the channel 57, the slots 55 and the annular space 38.

The spring 91, Fig. 13, of the main control valve 78 is now no longer opposed by any force and will therefore move the main control slide 78 to the right, overcoming the frictional resistance. The spring is associated in its action in that the annular space 35 of the valve 80 now communicates with the slots 44 in the bushing 46. Thus the delivery side of the pump is connected by means of the bores 72, 73 and 74 with the space 33, which at this moment is in register with the slots 71. The pressure fluid will therefore flow through these slots, the channel 68, the radial slots 69 and the longitudinal slots 70 into the annular space 96 and acts upon the left side of the piston 85.

The pressure fluid pump now communicates with the left side of the cylinder through the channel 41, the slots 42, the space 94, the slots 49 and the conduit 47.

When reversing from the rearward stroke to the forward stroke the auxiliary control valve 80 is again moved into the position shown in Fig. 13. The pressure fluid flowing from the right side of the cylinder through the opening 50 will accumulate in the channel 51 and the annular space 38, for the reason that the slots 60 and the channel 59 are shut off by the piston 31. The pressure of the accumulated fluid is transmitted through the slots 54, the channel 57 and the slots 53 to the space 22 and the main control valve 78 is moved to the right against the pressure of the spring 91 by the pressure acting upon the right side of the piston 87. This effect is augmented due to the fact that the space 22, as described, communicates directly with the delivery side of the pressure fluid pump through the channel 57 and the bore 76.

The central control valve 79, Fig. 13, can be displaced longitudinally until the annular space 23 communicates with the slots 64. In this position the annular space 23 is connected by means of the short longitudinal slots 24 with the bores 43, which communicate with the delivery side of the pressure medium pump. In this way the pressure fluid flowing from the left side of the cylinder will flow through the channel 65, the annular space 34, the channel 62, the slots 64, the annular space 23, and the longitudinal slots 24 towards the delivery side of the pressure fluid pump.

Figure 12:
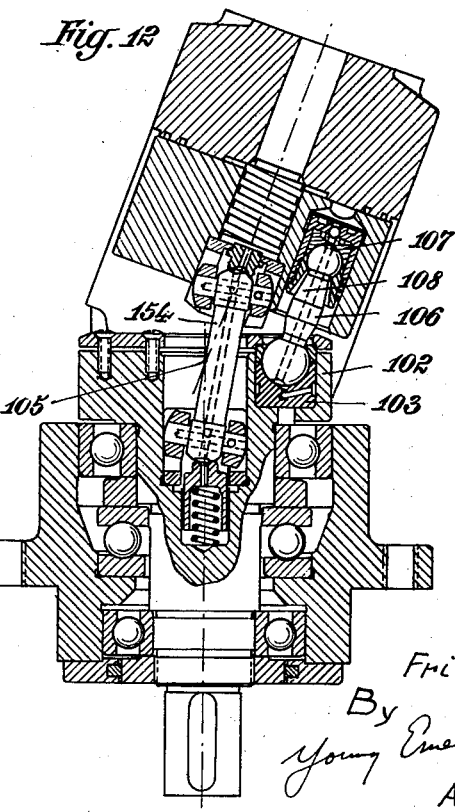
Fig. 12 is a section taken on line XII—XII of Fig. 11.

The pump used may be of any known circulating pump type. The details of the pump chosen for this embodiment of the invention are shown in Figs. 11 and 12. The electric motor 14 or 15, Fig. 5, drives the shaft 101, Fig. 11, which is enlarged into a flange 102 in which cylindrical bearing blocks 103, Fig. 12, are fixed.

A plurality of cylindrical bores 106, Fig. 12, provided near the circumference in the cylinder body 104, Fig. 11, which in any suitable manner is made to rock about the axis 105. The number of bores 106 corresponds with the number of bearing blocks 103. In addition the cylinder body 104 is rotatably arranged on the rod 153, Fig. 11, which is fixed in the swingable frame 152 and is connected with the driving shaft 101 by means of a shaft 154, which is coupled to the driving shaft 101 as well as the cylinder body 104 by Cardan joints. Arranged in the cylinder bores 106 are longitudinally displaceable pistons 107, the ball-shaped ends of which are received in the bearing blocks 103. By turning the cylindrical body 104 about the axis 105, the stroke of the piston 107 is altered. When the cylinder 104 coincides with the longitudinal axis of Fig. 12, the delivery of the rotary piston pump is zero. The more the cylinder is deflected, the larger becomes the stroke and the delivery.

159, Fig. 11, denotes the suction side and 160 the pressure side of the pump. If the control device is to be located directly on the pump it must be placed on the side 161.

The levers for the operation of the slides 79 and 80, Figs. 13 to 17, of the control device are arranged at the end wall 19, Fig. 19, of the tool holder slides 4 and 5. The control slide 79 for starting and stopping the machine is moved by the rod 39 by means of the levers 109, 110, Fig. 19. By means of the lever 109 and intermediate links the slide 79 can be so turned that the longitudinal channels 25 are in communication with the bores 43 in the bushing 45. In this way the inlet opening 40 is brought into direct communication with the opening 20 which leads to the outlet vessel, whereby the piston is stopped since the working piston 17, Fig. 1, no longer delivers pressure fluid.

By means of the lever 110 the control valve 79 can be displaced longitudinally in such a manner that the annular space 23 will be above the slots 64. In this way in the manner described above, the pressure fluid flowing out from the return side 100, Fig. 1, of the working cylinder 16 will flow to the delivery side of the pressure fluid pump, so that the velocity of the forward stroke of the machine is increased.

The rod 111, Figs. 13 and 20, of the auxiliary control slide 80 is constructed as a rack-bar and thus the teeth thereof mesh with a gear wheel 112. Since the control device of the pump in the preferred embodiment of the invention shown on the right half of Fig. 5 is arranged vertically, the shaft 113 of gear wheel 112 may be so arranged that its elongation can be received in a bearing in the end wall 19 of the tool holder slide 5. In a position deviating from the vertical position, for instance with a horizontal arrangement of the control device as shown on the left hand side of Fig. 5, a number of transmission members must be arranged between the shaft 113 and the actuating shaft which is supported in the end wall 19. Fixed on the end wall side of the rotatable shaft 113 is a lever 114, Figs. 4, 18 and 20, which is movable within the range of a rotatable circular disc 115, which is spaced from the shaft 113 and carries two slidable and adjustable stops 116 and 117 on the peripheral portion 118. The disc 115 also carries a worm wheel 119 which meshes with a worm 120, the rotatable shaft 121 of which is journalled in the tool holder slide and carries a gear wheel 122, Fig. 22. This gear wheel 122 meshes with a rack 123 which is fixed to the tool holder. The ratio with which the transmission members transmit the movement of the tool holder 6 or 7 to the disc 115 is so chosen that the longer stroke of the tool holder does not correspond fully to one revolution of the disc. By adjustment of the two stops 116 and 117 the length and position of the tool holder stroke may be adjusted as desired.

Also arranged on the end 19 of one of the two tool holders 4 or 5 is a speed indicator 155, Fig. 21, which indicates the velocity of the tool holder.

Also the lever 114, by means of which the circulating pump is deflected and the delivery of the pump is regulated, is arranged on the head of the tool holder slide. In this embodiment the pump is deflected by means of an auxiliary electric motor. This arrangement is shown in detail in Figs. 6 to 8.

As described in the foregoing the pump 11, Fig. 6, and the control device (not shown) are arranged in the casing 9. The pump motor 15 is fixed to the casing by means of flanges.

The swingable frame 152, Fig. 7, with the cylinder body 104 is, as described, tiltable about the axis 105, Fig. 12. This frame 152 carries on one side a small bracket 125 on which is located a roller 124 which is loaded by a piston 127, which is arranged so as to be longitudinally displaceable in the cylinder body. The working chamber 128 of the piston 127 communicates with the oil circuit at a suitable point which during the forward stroke of the tool holder is under pressure but during the return stroke communicates with the outlet vessel. The chamber 128 may for instance be connected, not shown, with the chamber 22, Figs. 13 and 17, of the control device. The piston 127 attempts to hold the frame 152 with the cylinder body 104, Fig. 11, on the central longitudinal axis of the pump, i. e. in a position in which no fluid is delivered. A spring 129, one side of which is secured on the frame 152 and the other end is attached to a suitable point on the casing 9, tends to turn the frame 152 with the cylinder body 104 and to set it for maximum pump delivery.

The delivery during the forward stroke of the pump is altered by means of a cam 130, Fig. 7, which is keyed to a shaft 131, rotatably arranged in a cover 132 of the casing 9. Fixed on the shaft 131 or on a collar of the cam 130 is a worm wheel 133, which cooperates with a worm 134, Fig. 8, the shaft 135 of which is rotatably mounted in the cover 132. This shaft 135 is also provided with a worm wheel 136, with which a worm 137 meshes, the shaft 138 of which is parallel to the shaft 131 and to which the shaft of an auxiliary electric motor 139 is secured by means of a flange. The motor 139 is fixed in any suitable manner to the cover 132.

The motor 139 is reversible, so that the cam 130 can be rotated in either direction.

By corresponding adjustment of the cam 130 the delivery on the forward stroke can be altered as desired. The cam 130 is arranged within the range of a stop 140 fixed to the head of the piston 127. The piston can therefore only deflect the cylinder body 104, Fig. 11, as far as the position of the cam 130 allows. Due to the two worm wheels arranged in series the transmission ratio between the auxiliary motor 139 and the shaft 131 is very high, so that a considerable number of revolutions of the auxiliary motor 139 corresponds to only a small deflection of the shaft 131.

The cylinder chamber 128 is without pressure during the return of the tool holder, so that the spring 129 swings the frame 152 and with it the cylinder body 104 into the position which corresponds to maximum delivery. By means of an additional cam 141, Fig. 8, the shaft 142, Fig. 7, of which is also rotatably mounted in the cover 132, it is also possible to alter the velocity of the return stroke. For this purpose the cam 141 engages the rear part of the stop 140, so that the spring 129 is only able to deflect the cylinder body in accordance with the position of the cam 141. Since in the usual working operations of the shaping machine such alteration of the velocity of the return stroke is seldom necessary, in the embodiment shown in the adjustment wheel for the cam 141 is fixed directly to the shaft 142. The movement is thus not transferred to the end 19 of the tool holder slide.

For the control of the auxiliary motor 139, a switch 143, Fig. 3, is arranged on the front side of the appertaining tool holder slide.

The top 144, Fig. 1, of the support 1 has no interruptions. The slides 4 and 5 are guided along the support 1 by the guides 145 and 146. While the guide 145 is arranged in known manner on the front side of the table, the guide 146 is located substantially in the middle of the support top and is held by a slightly tapered moulding 147. The conical moulding can be adjusted in known manner by means of the screws 148.

To cause the advance movement a rack 149 is also fixed to the support 1. The teeth of this rack mesh with a toothed gear 15, Fig. 1, rotatably arranged in the slide 4 or 5. The automatic advance is preferably carried out hydraulically. For this purpose a piston device may be used to which pressure fluid is admitted in the cycle of the forward and return stroke of the tool holder. In the embodiment shown, the movement of the reversing slide 78, Fig. 13, can be utilised with particular advantage for the drive of the members which cause the automatic advance of the tool holder slide.

Each of the tool holder slides 4 or 5 may be moved manually or by means of a special electric motor 158, Fig. 21.

In the embodiment shown in Figs. 18–23 the control device 13, Fig. 23, is no longer mounted directly on the pump 11 but is incorporated within the slide 5. The feed movement, i. e. the displacement of the slide 5 on the support 1 is effected by means of a rack-bar 149, Fig. 21, which is rigidly secured to the support and in which engages a pinion 150 rotatably mounted on the slide. This pinion can be rotated in three different ways:

1. Automatically from the main valve 78 of the control device (automatic feed),
2. By means of the reversible electric motor 158 secured on the slide 5 (high-speed movement or mechanical feed movement),
3. Manually.

The central control valve 79 may again be both displaced longitudinally as well as rotated by means of two levers 109 and 110, Fig. 18. The auxiliary valve is moved by means of a stop disk 115 which is constructed similarly to that of the embodiment of Figs. 1–17.

Secured to the control valve body 78 is a rod 86 on which is mounted the spring 91 (Fig. 13) which bears at one end against a stop 90, Fig. 20, rigidly connected with the rod 86 and at the other end against a bearing body 88, which constitutes a rigid component of the casing of the slide 5. Journalled in this bearing body is a shaft 89, the axis 92 of which is at right-angles to the axis of the shaft 86. The shaft 89 carries a gear wheel, the teeth of which engage in the teeth of a rack-bar 93 formed on the shaft 86.

Secured on that end of the shaft 89 which terminates above the slide 5, is a disc 97, Figs. 19 and 22, provided with a diametrally extending groove 21. Displaceable in this groove is a block 26 which can be moved to and fro in the slot by means of a threaded shaft 28 and an adjusting wheel 29.

Journalled at some distance from the disc 97 towards the rear end of the slide is a ratchet wheel 30, Fig. 19, which, in the present case, has a particular construction. The pawl 48 is, in this case, rotatably arranged about two parallel pins 163, 164. One pivot 164 is engaged by a rod 165 which connects the pawl 48 with the block 26. The other pivot 163 is mounted on a lever 162 which is freely mounted on the shaft 166 of the ratchet wheel 30. To avoid rearward rotation of the ratchet device during idle movement of the ratchet 30, 48, a further pawl 167 engages in the teeth of the ratchet wheel 30.

The shaft 166 of the ratchet wheel 30 is journalled on the top of the slide 5 and carries within the slide a bevel gear wheel 169, Fig. 18, which engages two bevel wheels 171, 172 freely mounted on the shaft 170, Fig. 20. The shaft 170 is parallel to the shafts 86, 89 and 111 of the three control valves.

Mounted for rotation on the axis 170 are three shafts 168, 173, 174, Fig. 20, which can be coupled together by means of separate coupling devices. Interposed between the two shafts 168 and 173 is a coupling device 175 which has a coupling member 176 longitudinally displaceable on the shaft 173. The coupling member 176 is provided with coupling teeth on the outwardly facing radial surfaces. The coupling teeth provided on the righthand side can engage in corresponding teeth on a sleeve 177 which is keyed on the lefthand end of the shaft 168. The teeth of the coupling member 176 on the lefthand side can engage in corresponding teeth on a sleeve 178 which is freely rotatable on the shaft 173 and is rigidly connected with a worm wheel 179. The teeth of this worm wheel are engaged by a worm 180 which is driven by the reversible electric motor 158 mounted on top of the slide 5.

Mounted in the interior of the slide 5 on a shaft 181, Fig. 21, which carries the gear wheel 150 engaging in the rack bar 149 on the support 1 is a worm wheel 182, the teeth of which engage a worm 183 which is keyed to the shaft 173. Secured to the lefthand end of this shaft 173, Fig. 20, is a coupling member 184, the lefthand side of which is provided with coupling teeth which cooperate with corresponding teeth on a coupling member 185 provided on the shaft 174. The lefthand projecting end of the shaft 174 is made square in cross-section to receive a handwheel or the like.

The two bevel wheels 171, 172 freely mounted on the shaft 168 are provided on their adjacent sides with teeth in which engage the teeth of a coupling member 186 longitudinally displaceable on the shaft 168. The feed control operates in the following manner:

When pressure fluid is admitted to the space 22 of the main control valve 78, i. e. when the main control valve moves to the left, the shaft 89 and thus the disc 97, Fig. 19, are rotated in counter-clockwise direction, the movement being transmitted to the shaft 166, Fig. 18, by means of the rod 165 and the ratchet 48, 30. On the other hand when the control valve 78, Fig. 20, moves to the right, there is no movement of the shaft 166. The magnitude of the automatic feed is adjusted by setting the block 26, Fig. 19, closer or farther from the center of the groove 21. When the block 26 is on the axis 92, the automatic feed caused by the movement of the control valve 78 to the left, is zero.

The direction of the feed is determined by means of the coupling member 186, Fig. 20. The bevel wheel 169 secured on the shaft 166, drives the bevel wheel 171 in one direction of rotation and the bevel wheel 172 in the other direction of rotation. By engaging the teeth of one or the other bevel wheel with the coupling member 186 which is mounted so as to be longitudinally displaceable but non-rotatable on the shaft 168, the shaft 168 can be driven in one or the other direction of rotation, as desired.

If the coupling member 176, Fig. 20, of the coupling device 175 is moved to the right, the rotary movement of the shaft 168 is transmitted to the worm wheel 182 by way of the sleeve 177, the coupling member 176, the shaft 173 and the worm 183, so that the shaft 181 and with it the gear wheel 150 are rotated in one or the other direction. If, however, the coupling member 176 of the coupling device 175 is moved to the left, then no movement of the shaft 168 is transmitted to the shaft 173. By driving the reversible motor 158, Fig. 22, in one or the other direction, the shaft 173 is driven by means of the worm 180, the worm wheel 179 and the coupling member 176, whereby the gear wheel 150 is moved in one direction or the other by the elements referred to.

As the teeth of the coupling member 185 can be brought into engagement with those of the coupling member 184, the shaft 173 and thus the gear wheel 150 can in addition be rotated manually in one direction or the other.

Freely journalled in the outwardly facing lateral wall of the slide 5 is the stop disc 115, Fig. 18, which is provided with internal teeth 187. These teeth are engaged by a gear wheel 188, the shaft 121 of which is freely journalled in the slide 5. Keyed to the other end of this shaft is a gear wheel 122, which in the manner already described, engages in the teeth of a rack-bar 123 which is rigidly secured to the reciprocating tool holder 7. Also provided on the shaft 121, as seen from Figs. 21 and 22, is a worm 188 which engages with a worm wheel 189 which is secured on a shaft 190 freely rotatable in the slide 5 and serving for driving the tachometer 155. Mounted parallel to the stop disc 115 is a freely rotatable shaft 113, Fig. 18, the outer end of which carries a lever 114, which, in the same manner as the corresponding lever in the embodiment described with reference to Figs. 1–17, cooperates with the stops 116, 117 of the stop disc 115, which are adjustable along the annular groove 118. Secured on the other end of the shaft 113 which lies within the slide 5 is a gear wheel 112, Fig. 20, which engages in a corresponding rack bar forming part of the rod 111 of the auxiliary valve 80.

In accordance with the position of the stops 116 and 117, the auxiliary valve 80 is moved into one or the other rest position in a definite end position of the tool holder 7. The auxiliary valve can also be displaced by hand independently of the automatic control by turning the handle of the lever 114. Otherwise the mode of operation of the drive for the auxiliary valve differs in no way from that described for the embodiment according to Figs. 1–17.

Provided on the rod 39 of the central valve 79 towards the end face of the slide 5 is a rack bar 191, Fig. 20, the teeth of which however extend around the rod. These teeth mesh with a gear wheel 192, the shaft 193 of which is provided with a handle 110 on its outward end. The end of the rod 39 terminating in the end face 19 of the slide 5 is, in addition, provided with a handle 109. In the manner described with reference to Figs. 1–17, and for the same purpose, the central valve 79 can be turned by means of the lever 109 and displaced longitudinally by means of the lever 110.

The coupling member 186, the displacement of which determines the direction of the automatic feed movement, is displaced by means of a handle 194 which is pivoted near the end face 19 of the slide 5. In a similar way, the coupling member 176, the displacement of which throws in the high-speed movement or the automatic-feed movement, is displaced by means of a lever 195 mounted near the end face 19. The linkages transmitting the movement of the levers 194, 195 to the coupling members 186 and 176 are not shown and described for the reason that they can be constructed in any suitable manner which would be obvious to a person skilled in the art.

I claim:

1. A shaping machine comprising a tool holder, a tool holder slide which is movable transversely to the planing direction and on which the tool holder reciprocates in the planing direction, and hydraulic means for driving the tool holder and comprising a pump and a control device which are rigidly connected with the tool holder slide.

2. A shaping machine according to claim 1, in which a support and two longitudinal guides are provided, said tool holder slide being guided in the support and one of the guides being arranged at the front edge of the support and the other guide in the top of the support, between the front edge and the rear edge of the latter.

3. A shaping machine according to claim 1, in which an electric motor is provided for driving the pump which is rigidly connected with the tool holder slide.

4. A shaping machine according to claim 1, in which a casing is provided in which the pump and the control device are arranged and which simultaneously serves for reception of the hydraulic fluid.

5. A shaping machine according to claim 1, in which the control device is provided directly on the pump.

6. A shaping machine according to claim 1, in which the pump and the control device are arranged on a lower side of the end of the tool holder slide remote from the tool.

7. A shaping machine according to claim 1, in which means are provided for operating the pump and the control device which are arranged on an end face of the tool holder slide adjacent the tool.

8. A shaping machine comprising a tool holder, a tool holder slide which is reciprocable transversely to the planing direction, hydraulic means for driving the tool holder and comprising a pump and a control device which are rigidly connected with the tool holder slide, an auxiliary control slide, a slide for effecting the reversal of the tool holder movement operated by said auxiliary control slide, and a shaft rotatably arranged in the tool holder slide for shifting the auxiliary control slide.

9. A shaping machine according to claim 1, in which a separate electric auxiliary motor is provided to control the load of the pump.

10. A shaping machine comprising a tool holder, a tool holder slide which is reciprocable transversely to the planing direction, hydraulic means for driving the tool holder and comprising a pump and a control device which are rigidly connected with the tool holder slide, an auxiliary control slide, a slide for effecting the reversal of the tool holder movement operated by said auxiliary control slide, a shaft rotatably arranged in the tool holder slide for shifting the auxiliary control slide, a lever connected to the auxiliary control slide, stop means to limit the movement of the lever, a circular disk on which the stop means is adjustably mounted, a worm shaft for rotating the circular disk to adjust the stop means, and means for operatively connecting the worm shaft with the tool holder.

FRITZ WEGERDT.